(12) United States Patent
Mellander

(10) Patent No.: US 8,419,021 B2
(45) Date of Patent: Apr. 16, 2013

(54) RING SEAL WITH INSERT

(75) Inventor: Carl-Hugo M. Mellander, Ettlingen (DE)

(73) Assignee: TI Group Automotive Systems, L.L.C., Auburn Hills, MI (US)

(*) Notice: Subject to any disclaimer, the term of this patent is extended or adjusted under 35 U.S.C. 154(b) by 639 days.

(21) Appl. No.: 12/607,602

(22) Filed: Oct. 28, 2009

(65) Prior Publication Data

US 2010/0109260 A1 May 6, 2010

Related U.S. Application Data

(60) Provisional application No. 61/110,234, filed on Oct. 31, 2008.

(51) Int. Cl.
*F16J 15/32* (2006.01)

(52) U.S. Cl.
USPC .......................................................... 277/567

(58) Field of Classification Search ................. 277/566, 277/567, 624, 647
See application file for complete search history.

(56) References Cited

U.S. PATENT DOCUMENTS

| | | | |
|---|---|---|---|
| 1,157,574 A | 10/1915 | Mueller | |
| 1,632,042 A | 6/1927 | Price et al. | |
| 2,016,227 A | 1/1932 | Clausen | |
| 2,107,922 A | 2/1935 | Westin | |
| 2,084,605 A | 6/1937 | Webb | |
| 2,230,725 A * | 2/1941 | Nathan | 277/624 |
| 2,349,587 A | 5/1944 | Brand | |
| 2,465,175 A * | 3/1949 | Schwarz et al. | 277/562 |
| 2,467,061 A * | 4/1949 | Mason | 220/327 |
| 2,647,002 A | 7/1953 | Brummer | |
| 2,676,041 A | 4/1954 | Englesson | |
| 2,841,429 A | 7/1958 | McCuistion | |
| 2,901,139 A | 4/1959 | Isele-Aregger | |
| 3,106,406 A | 10/1963 | Liebig | |
| 3,306,622 A | 2/1967 | Liebig | |
| 3,313,440 A | 4/1967 | Nofer | |
| 3,331,611 A | 7/1967 | Liebig | |
| 3,467,448 A | 9/1969 | Galle | |
| 3,512,789 A * | 5/1970 | Tanner | 277/647 |
| 3,700,136 A | 10/1972 | Ruekberg | |
| 3,722,730 A | 3/1973 | Joos | |
| 3,788,510 A | 1/1974 | Collins | |

(Continued)

FOREIGN PATENT DOCUMENTS

| CA | 2537673 A1 | 8/2007 |
|---|---|---|
| DE | 102005037683 A1 | 2/2007 |

(Continued)

OTHER PUBLICATIONS

Drawing—TI Group Automotive Systems, Seal—CAM Lock, Model Year 2003.

*Primary Examiner* — Vishal Patel

(74) *Attorney, Agent, or Firm* — Reising Ethington P.C.

(57) ABSTRACT

One embodiment of a seal includes a body portion, a skirt portion, and an insert. The body portion is composed of a first material. The skirt portion extends from the body portion and is also composed of the first material. The skirt portion has an inboard leg and an outboard leg that move toward each other upon collapse in use. The insert is carried by the body portion and is composed of a second material which is more rigid than the first material.

15 Claims, 3 Drawing Sheets

U.S. PATENT DOCUMENTS

| | | |
|---|---|---|
| 3,788,654 A | 1/1974 | Mandley |
| 3,825,147 A | 7/1974 | Noponen et al. |
| 3,918,726 A | 11/1975 | Kramer |
| 3,942,677 A | 3/1976 | Hagen et al. |
| 3,985,511 A | 10/1976 | Betts |
| 4,094,460 A | 6/1978 | Scanga et al. |
| 4,111,441 A * | 9/1978 | Sick et al. ............... 277/566 |
| 4,248,439 A | 2/1981 | Haslett |
| 4,262,914 A | 4/1981 | Roley |
| 4,298,206 A * | 11/1981 | Kojima ............... 277/626 |
| 4,344,629 A | 8/1982 | Oelke |
| 4,364,572 A | 12/1982 | Yamamoto et al. |
| 4,394,024 A * | 7/1983 | Delhaes ............... 277/619 |
| 4,426,091 A | 1/1984 | Baylor |
| 4,434,909 A * | 3/1984 | Ott ............... 220/316 |
| 4,511,152 A * | 4/1985 | Fournier ............... 277/612 |
| 4,561,701 A | 12/1985 | Fujii et al. |
| 4,568,090 A | 2/1986 | Westemeier |
| 4,569,637 A | 2/1986 | Tuckey |
| 4,674,756 A * | 6/1987 | Fallon et al. ............... 277/624 |
| 4,685,685 A * | 8/1987 | Iverson ............... 277/562 |
| 4,694,857 A | 9/1987 | Harris |
| 4,813,690 A | 3/1989 | Coburn, Jr. |
| 4,834,398 A * | 5/1989 | Guzowski et al. ............ 277/624 |
| 4,974,570 A | 12/1990 | Szwargulski et al. |
| 5,029,879 A | 7/1991 | Strang, Sr. et al. |
| 5,033,435 A | 7/1991 | Ostarello et al. |
| 5,036,822 A | 8/1991 | Kojima |
| 5,056,492 A | 10/1991 | Banse |
| 5,213,342 A | 5/1993 | Weber |
| 5,234,039 A | 8/1993 | Aoshima et al. |
| 5,265,890 A | 11/1993 | Balsells |
| 5,330,068 A | 7/1994 | Duhaime et al. |
| RE34,874 E * | 3/1995 | Newman et al. ............... 277/625 |
| 5,536,018 A | 7/1996 | Szott |
| 5,551,707 A | 9/1996 | Pauley et al. |
| 5,860,680 A | 1/1999 | Drijver et al. |
| 5,879,010 A | 3/1999 | Nilkanth et al. |
| 5,913,441 A | 6/1999 | Voirol |
| 5,944,323 A | 8/1999 | Cavka |
| 6,012,904 A | 1/2000 | Tuckey |
| 6,091,175 A | 7/2000 | Kinsinger |
| 6,161,841 A | 12/2000 | Shaw |
| 6,164,663 A | 12/2000 | Turner |
| 6,189,716 B1 | 2/2001 | Lawrukovich et al. |
| 6,196,552 B1 * | 3/2001 | Peterson et al. ............... 277/437 |
| 6,257,594 B1 | 7/2001 | Halling et al. |
| 6,299,178 B1 | 10/2001 | Halling et al. |
| 6,305,483 B1 | 10/2001 | Portwood |
| 6,318,736 B1 | 11/2001 | Halling |
| 6,332,555 B1 | 12/2001 | Stangier |
| 6,357,618 B1 | 3/2002 | Kloess et al. |
| 6,357,759 B1 | 3/2002 | Azuma et al. |
| 6,357,760 B1 | 3/2002 | Doyle |
| 6,367,802 B1 * | 4/2002 | Knapp ............... 277/314 |
| 6,418,959 B2 | 7/2002 | Kondo |
| 6,419,236 B1 | 7/2002 | Janian |
| 6,419,282 B1 | 7/2002 | Hornby |
| 6,435,365 B2 | 8/2002 | Pachciarz et al. |
| 6,439,203 B1 | 8/2002 | Cooke |
| 6,446,978 B1 | 9/2002 | Halling et al. |
| 6,450,502 B1 | 9/2002 | Baehl et al. |
| 6,497,415 B2 | 12/2002 | Castleman et al. |
| 6,502,826 B1 | 1/2003 | Schroeder et al. |
| 6,533,288 B1 | 3/2003 | Brandner et al. |
| 6,543,785 B1 | 4/2003 | Katayama et al. |
| 6,612,030 B2 | 9/2003 | Halling |
| 6,624,252 B2 | 9/2003 | Yabe et al. |
| 6,626,440 B2 | 9/2003 | Halling |
| 6,669,043 B2 | 12/2003 | Fish et al. |
| 6,682,079 B2 | 1/2004 | Reisel et al. |
| 6,688,608 B2 | 2/2004 | Doyle |
| 6,691,888 B2 | 2/2004 | Moser et al. |
| 6,698,613 B2 | 3/2004 | Goto et al. |
| 6,739,319 B2 | 5/2004 | Braun et al. |
| 6,755,422 B2 | 6/2004 | Potter |
| 6,769,698 B2 | 8/2004 | Kamiya et al. |
| 6,854,739 B2 | 2/2005 | Schleth et al. |
| 6,915,812 B2 | 7/2005 | Frohwein |
| 6,916,024 B2 | 7/2005 | Hanashima et al. |
| 6,942,225 B2 | 9/2005 | Gentemann et al. |
| 6,962,373 B2 | 11/2005 | Houghton |
| 7,063,226 B2 | 6/2006 | Palvoelgyi et al. |
| 7,083,065 B2 | 8/2006 | Zdroik |
| 7,118,140 B2 | 10/2006 | Kilgore |
| 7,134,671 B2 | 11/2006 | Duke et al. |
| 7,140,617 B2 | 11/2006 | Popielas et al. |
| 7,146,730 B2 | 12/2006 | Bergsma et al. |
| 7,159,607 B2 | 1/2007 | Frohwein et al. |
| 7,195,246 B2 | 3/2007 | Aoshiba et al. |
| 7,828,302 B2 * | 11/2010 | Hurlbert et al. ............... 277/637 |
| 2001/0040348 A1 * | 11/2001 | Kojima ............... 277/602 |
| 2001/0045709 A1 | 11/2001 | Stobbart |
| 2002/0017527 A1 | 2/2002 | Goto et al. |
| 2002/0043536 A1 | 4/2002 | Huse |
| 2002/0053769 A1 | 5/2002 | Oiarbide Aseguinolaza |
| 2002/0158419 A1 | 10/2002 | Zitting et al. |
| 2002/0175165 A1 | 11/2002 | Jones |
| 2004/0021271 A1 | 2/2004 | Tratnik |
| 2004/0239047 A1 | 12/2004 | Kent et al. |
| 2005/0012280 A1 | 1/2005 | Richardson |
| 2005/0027005 A1 | 2/2005 | Boldt |
| 2005/0194796 A1 | 9/2005 | Powell |
| 2005/0212220 A1 | 9/2005 | Graham |
| 2005/0218606 A1 | 10/2005 | Sakazaki et al. |
| 2005/0242571 A1 | 11/2005 | Houghton et al. |
| 2006/0006610 A1 | 1/2006 | Graham |
| 2006/0113309 A1 | 6/2006 | Zdroik et al. |
| 2006/0157941 A1 | 7/2006 | Vitel et al. |
| 2007/0012140 A1 | 1/2007 | Howlett et al. |
| 2007/0062841 A1 | 3/2007 | Nakamura et al. |
| 2007/0210528 A1 | 9/2007 | Baber |
| 2007/0216108 A1 * | 9/2007 | Zitting et al. ............... 277/567 |
| 2007/0216111 A1 * | 9/2007 | Matsui ............... 277/647 |
| 2008/0067760 A1 | 3/2008 | Kikuchi et al. |

FOREIGN PATENT DOCUMENTS

| | | |
|---|---|---|
| FR | 1186929 A | 9/1959 |
| JP | 2003025857 | 1/2003 |
| JP | 2003072824 A | 3/2003 |
| JP | 2004278622 A | 10/2004 |
| JP | 2005016626 A | 1/2005 |
| JP | 2005016651 A | 1/2005 |
| JP | 2006069612 A | 3/2006 |
| WO | 2005108144 A2 | 11/2005 |

* cited by examiner

RING SEAL WITH INSERT

CROSS-REFERENCE TO RELATED APPLICATIONS

This application claims the benefit of U.S. Provisional Application No. 61/110,234 filed Oct. 31, 2008.

FIELD OF THE INVENTION

The invention relates generally to seals, and more particularly to ring seals used to seal joints.

BACKGROUND OF THE INVENTION

Automotive fuel system seals include polymeric, deformable components that are widely used in different applications to make a fluid-tight joint between parts, and typically include ring-shaped axial seals and radial seals or O-rings. In use, radial seals are compressed in a radial direction perpendicular to a seal centerline on radially inside and outside surfaces of the radial seals cross-section, whereas axial seals are compressed in an axial direction parallel to a seal centerline on axially opposed surfaces of the axial seals cross-section.

Axial seals are widely used to seal openings of containers. For example, axial seals are often used to seal an opening in a fuel tank and can be disposed in a flange-type joint between a plug and a fuel tank wall.

SUMMARY OF THE INVENTION

One embodiment of a ring seal may include a body portion, a skirt portion, and an insert. The body portion may comprise a first material. The skirt portion may extend from the body portion and may comprise the first material. The skirt portion may include, when it is viewed in cross-sectional profile and in an uncompressed state, an inboard leg, an outboard leg, and a recess between the inboard and outboard legs. When the skirt portion is being compressed or is in a compressed state, the recess is partially or completely collapsed, and inside surfaces of each of the inboard and outboard legs move toward each other and may contact each other. The insert may be carried by the body portion and may comprise a second material. The second material may be more rigid than the first material. The insert may include an anchor portion and an exposed portion. The anchor portion may be surrounded at least in part by the body portion. The exposed portion may extend from the anchor portion and may have at least a part located outside of the body portion.

One embodiment of a seal may include a body portion, a skirt portion, and an insert. The body portion may have its dimension of greatest magnitude orientated in the radial direction. The body portion may comprise a first material. The skirt portion may extend from the body portion in a substantially perpendicular direction. The skirt portion may comprise the first material. The skirt portion may have its dimension of greatest magnitude orientated in the axial direction. The insert may comprise a second material which may be more rigid than the first material. The insert may include an anchor portion and an exposed portion. The anchor portion may be surrounded on all sides by the first material of the body portion in order to fix the insert to the body portion. The exposed portion may extend from the anchor portion, and may be located outside of the body portion and may constitute the radially outermost structure of the seal; in other words, the exposed portion may extend in the radial-outwardly-direction farther than any other structure of the seal. The exposed portion may have a bend and an angled outer surface which may extend from the bend. The angled outer surface may be angled with reference to the radial direction. The angled outer surface may be positioned so that it abuts or otherwise comes into contact with a component of a vessel during assembly of the associated joint.

BRIEF DESCRIPTION OF THE DRAWINGS

The following detailed description of preferred embodiments and best mode will be set forth with reference to the accompanying drawings, in which.

DETAILED DESCRIPTION OF PREFERRED EMBODIMENTS

An exemplary embodiment of a ring seal is shown and described having a circular and cylindrical shape, and thus naturally defines various directions with respect to the shape. For example, the term "axially" refers to a direction generally parallel with an imaginary center axis C (FIG. 1) of the shape, the term "radially" refers to a direction generally parallel to or along any one of the imaginary radii extending from the center axis C, and the term "circumferentially" refers to a direction generally along an imaginary circumference of the shape.

Referring in more detail to the drawings, an exemplary embodiment of a ring seal 10 is shown that may be used in a flange-type joint of an automotive fuel tank to provide a pressure-tight and fluid-tight seal. The ring seal 10 is designed to limit or altogether prevent rolling, curling, twisting, and other mispositions of the ring seal that may occur during assembly and unassembly, or that may be caused by pressurized or vacuum conditions. Though described in the context of an automotive fuel tank, the ring seal 10 may be used in other applications requiring a liquid-tight seal, such as other vessels of automobiles, and vessels of recreational, marine, industrial, garden, and agricultural machines. And though described with a flange-type joint having a clamping ring, the ring seal 10 may also be used in flange-type joints having mating threads, also called a mason jar joint, and a non-flange-type joint.

Figure 7:
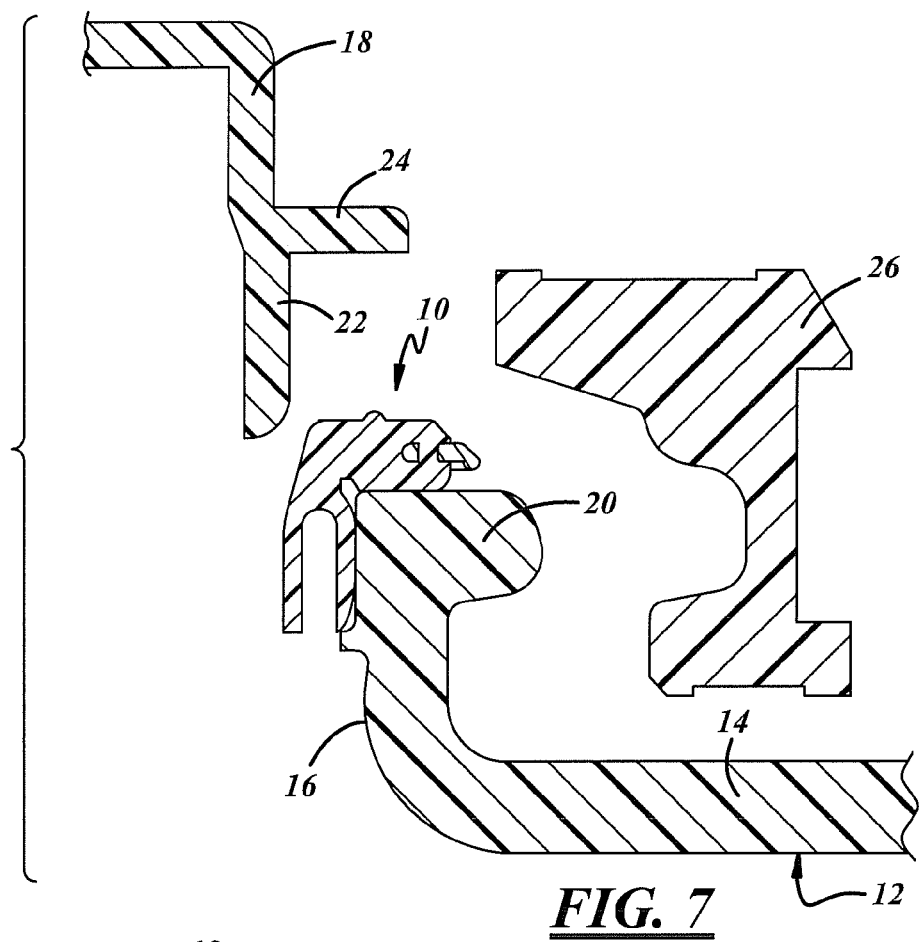
FIG. 7 is an unassembled view of an exemplary embodiment of a flange-type joint with the ring seal of FIG. 1.
Figure 8:
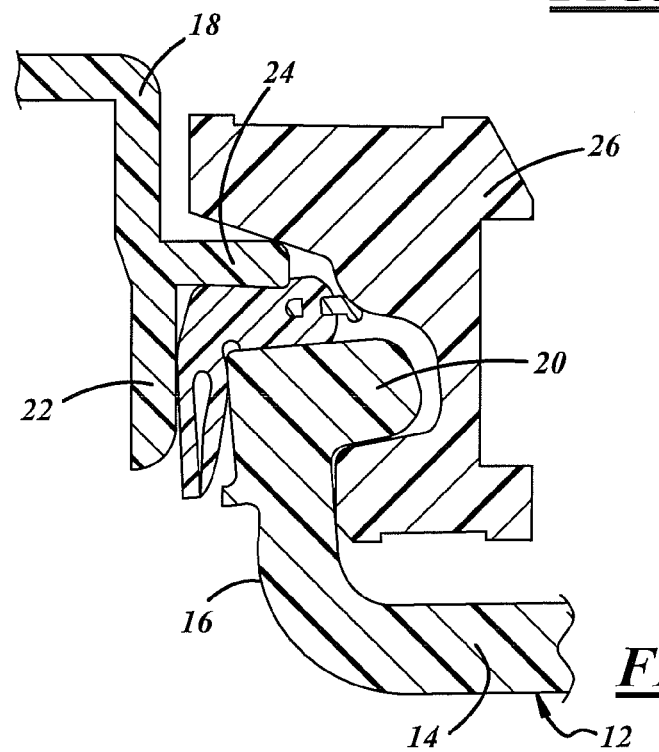
FIG. 8 is an assembled view of the flange-type joint and ring seal of FIG. 7.

Referring to FIGS. 7 and 8, a fuel tank 12 stores fuel for an associated automotive engine. The fuel tank 12 has a wall 14 which defines an opening 16 for receiving a cap 18. The opening 16 may also be defined by a lip 20 extending from the wall 14. The cap 18 may be used with a fuel delivery module or a fuel filler pipe, both of which may have various components passing through or suspended from the plug. The cap 18 may have a sidewall 22 and a flange 24. The sidewall 22 may extend generally axially with at least a portion thereof adapted for receipt within the opening 16 of the fuel tank 12. The flange 24 may extend outwardly or laterally from, and may be perpendicular to, the sidewall 22. At least a portion of the flange 24 may overlie the periphery of the opening 16 and/or the lip 20. And a clamping ring 26 may be placed over the ring seal 10 and over the cap 18 to form a flange-type joint around the opening 16. Of course, it should be appreciated that the flange-type joint may have more, less, and/or different components than shown and described. For example, additional fasteners may be used to secure the flange-type joint, the lip 20 may not be provided where the opening 16 may be defined only by the wall 14 and may be flush with the wall, and, as mentioned, the flange-type joint may be a mason jar joint.

Figure 1:
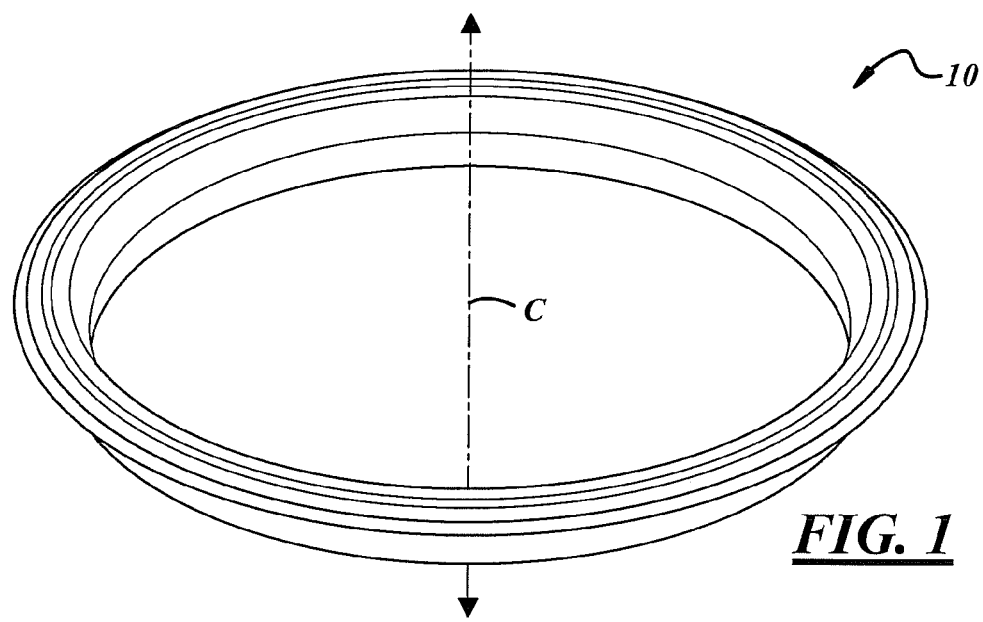
FIG. 1 is a perspective view of an exemplary embodiment of a ring seal.
Figure 2:
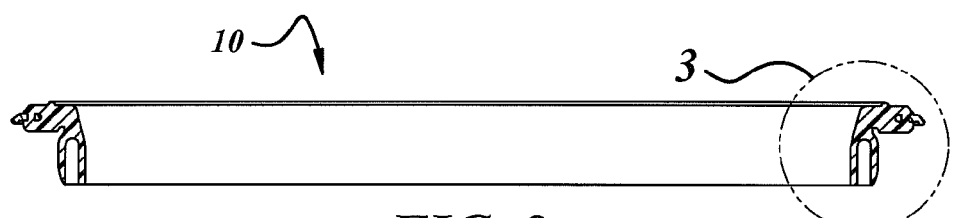
FIG. 2 is a cross-sectional view of the ring seal of FIG. 1.
Figure 3:
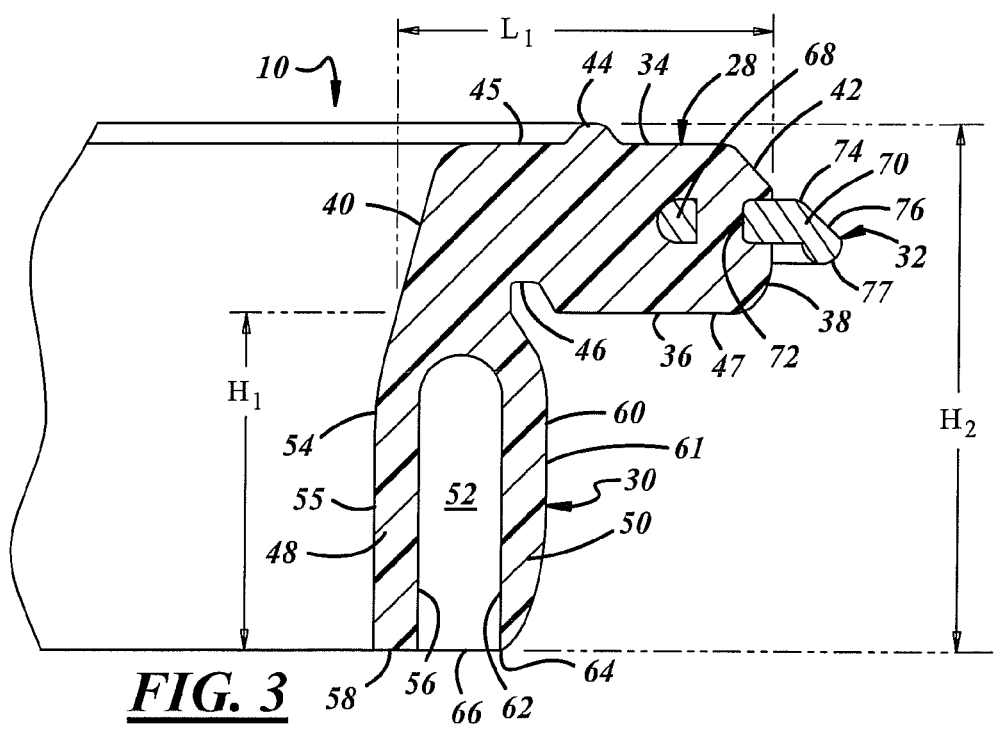
FIG. 3 is an enlarged view taken at circle 3 of FIG. 2.

The ring seal 10 may be complementary in size and shape to the opening 16. Referring to FIGS. 1-3, the ring seal 10 may have an annular shape and, in cross-section and in a relaxed or uncompressed state (FIG. 3), may be generally L-shaped. In the embodiment shown, the ring seal 10 may have a body portion 28, a skirt portion 30, and an insert 32.

The body portion 28 may extend laterally (e.g., radially) from the skirt portion 30, and may generally form a right angle with the skirt portion, if desired. As will be described in more detail below, the body portion 28 may carry the insert 32. The body portion 28 may have a first sealing surface 34 on its axially uppermost surface 45, and may have a second sealing surface 36 on its axially lowermost surface 47 (where "upper" and "lower" are stated with respect to the orientation of the seal as shown in the drawings). A radially outermost surface 38 bounds one side of the body portion 28 and a radially innermost surface 40 bounds an opposite side and may be slightly angled (e.g., 15°) with respect to the center axis C. An edge between the axially uppermost surface and the radially outermost surface 38 may have a chamfer 42 located thereon. The body portion 28 may further have a sealing bead 44 protruding from its otherwise planar axially uppermost surface 45. In one example, the sealing bead 44 may protrude an axial distance of about 0.5 mm above the otherwise planar axially uppermost surface 45; of course other example distances are possible. The sealing bead 44 may be circumferentially continuous around the body portion 28. Besides forming a seal when the flange-type joint is assembled, the sealing bead 44 may also strengthen an area of the body portion 28 which may undergo a relatively increased stress concentration in the body portion when assembled.

A groove 46 may be defined between the axially lowermost surface of the body portion 28 and the skirt portion 30. The groove 46 may facilitate displacement (e.g., bending or deflection) when the flange-type joint is assembled. This may give more compressive flexibility to the ring seal 10 as compared to a ring seal without a similar groove, and may also prevent tearing at the adjacent area.

Figure 4:
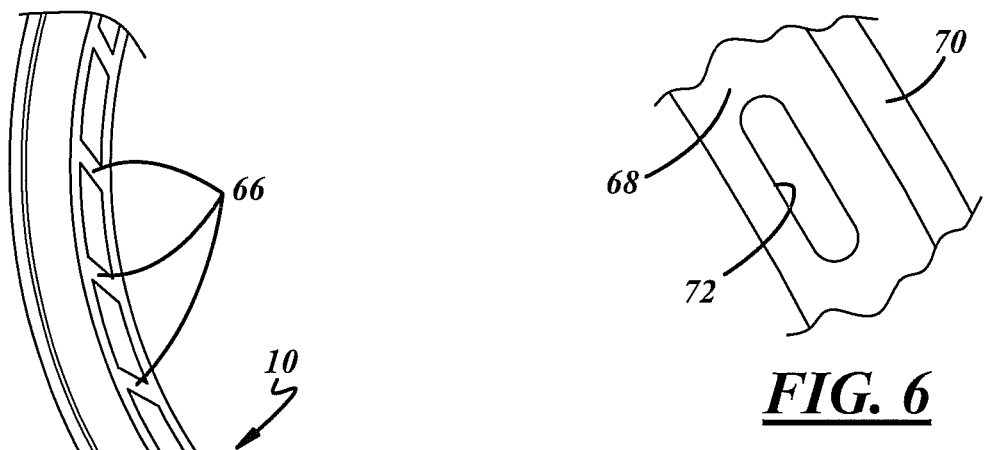
FIG. 4 is a bottom view of the ring seal of FIG. 1.

The skirt portion 30 may help maintain the position of the ring seal 10 against the lip 20 by, among other things, preventing a teetering movement of the ring seal, and may accommodate different openings 16 having slightly different diameters and different caps 18 having slightly different diameters, which may occur because of manufacturing tolerances. Referring to FIGS. 3 and 4, the skirt portion 30 may have a first or inboard leg 48, a second or outboard leg 50, and one or more recesses 52 between the legs. The inboard and outboard legs 48, 50 may be coextensive, may be generally parallel with respect to each other, and may be generally parallel with the center axis C. The inboard leg 48 may have a third sealing surface 54 on its radially innermost surface 55, and may have an inside surface 56 defining a part of the recess(es) 52. A free end 58 of the inboard leg 48 may be planar.

The outboard leg 50 may have a fourth sealing surface 60 on its radially outermost surface 61, and may have an inside surface 62 defining a part of the recess(es) 52. A free end 64 of the outboard leg 50 may be chamfered and may come to a point. Each recess 52 may provide a space for the inboard and outboard legs 48, 50 to collapse into or move toward each other upon assembly. The skirt portion 30 may thus compress to a greater extent as compared to a skirt portion without the recesses 52. The ring seal 10 may then accommodate different openings 16 and different caps 18. For example, each recess 52 may collapse more for a plug of greater diameter, and may collapse less for a plug of lesser diameter, while still maintaining the position and effectiveness of the ring seal 10 in both cases. In cross-section and in the uncompressed state, each recess 52 may be generally U-shaped. In one example, in cross-section and in the uncompressed state, each recess 52 may a radial length of about 2 mm; of course other radial lengths are possible. As best shown in FIG. 4, the recess(es) 52 may be spaced circumferentially around the ring seal 10, and each neighboring recess may be separated by an intermediate wall 66. The intermediate walls 66 may be inclined relative to the radial direction between the inboard and outboard legs 48, 50, and may be coextensive with the legs. The intermediate walls 66 provide structural support of the skirt portion 30 while still permitting deformation or collapse of each recess 52 and compression of the skirt portion.

Figure 6:
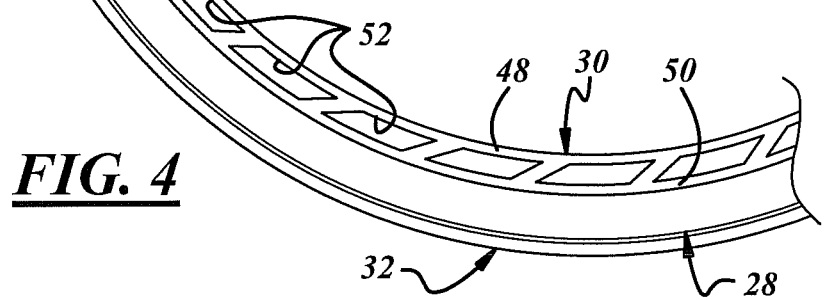
FIG. 6 is an enlarged view taken at circle 6 of FIG. 5.
Figure 5:
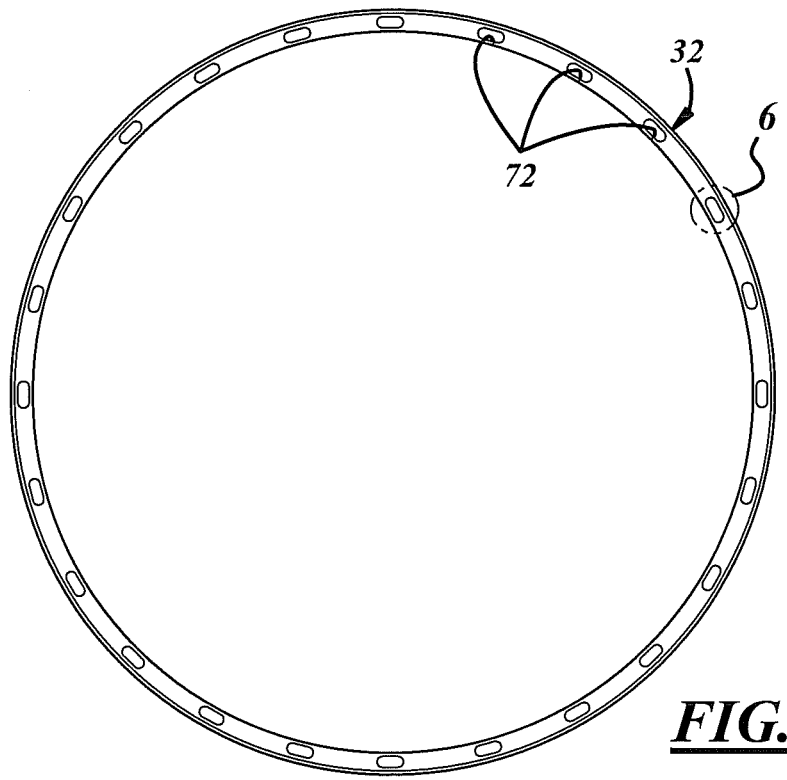
FIG. 5 is a top view of an exemplary embodiment of an insert that may be used with the ring seal of FIG. 1.

The insert 32 may help prevent rolling, curling, twisting, and other mispositions when the ring seal 10 is used in the flange-type joint. The insert 32 may reinforce and impart stiffness in the body portion 28 so that the ring seal 10 may sit firmly in the opening 16 and against the lip 20. The insert 32 may provide structural integrity to the body portion 28 while still permitting suitable compression thereof during use. While assembling the flange-type joint, the insert 32 may visibly indicate to an assembler that the ring seal 10 is positioned properly. In one example, the insert 32 may have a total radial length of about 4.2 mm; of course, in other examples, the insert may have other total radial lengths. Referring to FIGS. 3, 5, and 6, in this embodiment the insert 32 may have an anchor portion 68 and an exposed portion 70.

The anchor portion 68 may be embedded or carried in the body portion 28 so that it is surrounded by the body portion and fixes the insert 32 firmly therein. When embedded, the anchor portion 68 may form a mechanical interconnection between the insert 32 and the body portion 28. And in one example, when embedded, the anchor portion may be buried into the body portion 28 a total radial length of about 2.6 mm; of course other buried radial lengths are possible in other examples. Depending on the materials used, the anchor portion 68 may also, though need not, form a chemical bond with the immediately surrounding body portion 28. In the axial direction, the anchor portion 68 may be positioned about midway of the full axial extent of the body portion 28, or otherwise as desired. The anchor portion 68 may include one or more connection feature(s) such as openings 72. The connection feature(s) can have other forms including, but not limited to, a flange, a protrusion such as a lobe or rivet about which the body portion 28 may be formed or received to provide a mechanical interconnection between the insert 32 and the body portion 28. The openings 72 and/or other connection features, which may be used in combination or separately, may be spaced circumferentially around the insert 32, and may be equally or unequally spaced apart with respect to one another. Material of the body portion 28 may extend through the openings 72 to form an additional mechanical interconnection between the insert 32 and the body portion 28. In other embodiments, the anchor portion 68 need not necessarily have the openings 72 and still may form an adequate mechanical interconnection between the insert 32 and the body portion 28.

The exposed portion 70 may extend from the anchor portion 68 and outwardly of the body portion 28. The exposed portion 70 may extend radially outside of the radially outermost surface 38 of the body portion 28 to constitute the radially outermost structure of the ring seal 10. The assembler can thus readily view the exposed portion 70 to ensure proper positioning of the ring seal 10. The exposed portion 70 may have a bend 74 leading to an adjacent angled outer surface 76 that terminates at a free end 77. The angled outer surface 76 may form an angle of about 45° with respect to the radial direction; of course, in other examples, other angles are possible.

The body and skirt portions 28, 30 may be composed of a different material than the insert 32. For example, the insert 32 may be made out of a more rigid material than the body and skirt portions 28, 30. In one embodiment, the body and skirt portions 28, 30 may be composed of a relatively flexible and resilient material such as, but not limited to, a thermoplastic, a thermoset plastic, or an elastomer. In one example, the body and skirt portions 28, 30 may be composed of a fluoroelastomer (FKM) rubber. In another example, the body and skirt portions 28, 30 may be composed of a vapor-permeation-resistant polymer such as Viton® (available from DuPont Dow Elastomers of Wilmington, Del.), or the like, with a relatively high FKM fluorocarbon content. In yet another example, the body and skirt portions 28, 30 may be composed of any liquid-fuel-resistant elastomer, for example, a nitrile elastomer, a fluoro-silicone rubber, a butylene-nitrol elastomer, or a lower FKM content elastomer. Of course, other materials are possible.

The insert 32, on the other hand, may be composed of a relatively rigid material such any suitable metal, polymer, or composite. In one example, the insert 32 may be composed of a polyamide (PA) polymer. In another example, the insert 32 may be composed of 410S spring tempered stainless steel, or a zinc-plated plain carbon steel. In yet another example, the insert 32 may be composed of a relatively rigid polymer material including any suitable thermosetting material or Nylon® with or without a glass or mineral filler up to about 60% filled. In other examples, the insert 32 may be composed of PPA, PPS, Ultim, or other engineered polymers suitably formulated to provide rigidity.

The ring seal 10 may be manufactured by a number of ways, and the exact way may depend on the material used for the body and skirt portions 28, 30 and for the insert 32. In one example, the insert 32 may be made separately in a first injection molding process, may then be placed and held in position in a cavity of a die, and the cavity may then be filled with a molten material to form the body and skirt portions 28, 30. The molten material may pass through the openings 72 and may solidify therein. In another example, the body and skirt portions 28, 30 and the insert 32 may be made concurrently by a co-injection molding process where materials of all the components are injected into the same cavity. Of course, other manufacturing processes, including non-injection molding processes and other injection molding processes, may be used. And the insert 32 need not necessarily be inserted in the body portion 28 and instead can be carried by the body portion such as by being adhered to the radially outermost surface 38.

In general, the ring seal 10 may be designed, constructed, and shaped in order to limit or altogether prevent rolling, curling, twisting, and/or other mispositions of the ring seal that may occur during assembly and disassembly, or that may be caused due to pressurized or vacuum conditions. At least part of these goals may be accomplished by way of certain structures in the ring seal 10 and relationships among certain structures. For example, referring to FIG. 3, the greatest dimension of the body portion 28 may reside in its radial length $L_1$, which in one case may measure about 9.0 mm. The greatest dimension of the skirt portion 30 may reside in its axial height $H_1$, which in one case may measure about 5.7 mm. Also, the total axial height $H_2$ of the ring seal 10 may be about 11.9 mm. Of course, the above-mentioned structures and relationships need not exist in the ring seal 10, and all the dimensions mentioned may be different in different examples.

Referring to FIGS. 7 and 8, in assembly, the ring seal 10 may be placed around the opening 16 and over the lip 20. The body portion 28 may bear against an upper surface of the lip 20, and the skirt portion 30 may bear against an inner surface of the opening 16. The ring seal 10 remains in position due in part to the imparted rigidity of the insert 32 and thus, stiffer body portion 28. The cap 18 may then be placed in the opening 16 and over the ring seal 10. The sidewall 22 may abut the skirt portion 30 and the flange 24 may abut the body portion 28. The clamping ring 26 may then be brought over and may sandwich the cap 18, the ring seal 10, and the lip 20. Once the clamping ring 26 is tightened down, the flange-type joint may provide a pressure-tight and fluid-tight seal. The ring seal 10 may compress and form various seals with contiguous surfaces. For example, the flange 24 may bear against the first sealing surface 34 and the sealing bead 44 to form a first seal therebetween, the lip 20 may bear against the second sealing surface 36 to form a second seal therebetween, the sidewall 22 may bear against the third sealing surface 54 to form a third seal therebetween, and the lip 20 may bear against the fourth sealing surface 60 to form a fourth seal therebetween. All of these seals need not necessarily be formed in a particular flange-type joint with the ring seal 10; for example, the third and fourth seals may not be formed. And in other applications, the various seals may be formed with other components than described and shown. When assembled, the insert 32 may abut the clamping ring 26 at the angled outer surface 76 to further help maintain the position of the ring seal 10.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A ring seal, comprising:
  a circumferentially continuous body portion having an inboard side, an outboard side, a generally radially extending upper surface, a generally radially extending lower surface axially spaced from the upper surface, and comprising a first resilient, flexible and compressible material;
  a circumferentially continuous skirt portion integral with and extending generally axially from the body portion and comprising the first material, the skirt portion including, in cross-section and in an uncompressed state, a generally axially extending inboard leg immediately adjacent the inboard side of the body portion, a generally axially extending outboard leg radially spaced from and adjacent the inboard leg, both legs spaced radially inboard from the outboard side of the body portion and a recess between the legs, wherein, when in a compressed state, the recess is at least partially collapsed and respective inside surfaces of the inboard and outboard legs move toward each other;

the body portion extending radially outboard of the skirt portion and having its greatest dimension substantially in the radial direction, the skirt portion having its greatest dimension substantially in the axial direction, and an insert carried by the body portion and comprising a second material which is more rigid than the first material, the insert including an anchor portion received between the generally radially extending upper and lower surfaces and embedded in and surrounded at least in part by the body portion, and including an exposed portion extending from the anchor portion and projecting at least in part radially outside of the outboard side of the body portion.

2. The ring seal of claim 1 wherein the greatest dimension of the body portion in substantially the axial direction is less than the greatest dimension of the skirt portion in substantially the axial direction.

3. The ring seal of claim 2 wherein a groove is generally located at an intersection of the axially lowermost surface of the body portion and the radially outermost surface of the skirt portion, the groove facilitating displacement of the body and skirt portions upon compression during use of the ring seal.

4. The ring seal of claim 1 wherein the body portion has a sealing bead located at its axially uppermost surface, the sealing bead and the axially uppermost surface constituting a first sealing surface.

5. The ring seal of claim 1 wherein a plurality of intermediate walls extend between the inboard and outboard legs to define a plurality of separate recesses circumferentially spaced around the skirt portion.

6. The ring seal of claim 1 wherein, when the ring seal is in the uncompressed state, the inboard and outboard legs of the skirt portion are coextensive with respect to each other, are substantially parallel with respect to each other, and are substantially parallel with respect to a center axis of the ring seal.

7. The ring seal of claim 1 wherein:
a first sealing surface is located on an axially uppermost surface of the body portion and, when the ring seal is in the uncompressed state, the first sealing surface extends in the generally radial direction;
a second sealing surface is located on an axially lowermost surface of the body portion and, when the ring seal is in the uncompressed state, the second sealing surface extends in the generally radial direction and is generally parallel to the first sealing surface;
a third sealing surface is located on a radially innermost surface of the skirt portion and, when the ring seal is in the uncompressed state, the third sealing surface extends in the generally axial direction; and
a fourth sealing surface is located on a radially outermost surface of the skirt portion and, when the ring seal is in the uncompressed state, the fourth sealing surface extends in the generally axial direction and is generally parallel to the third sealing surface.

8. The ring seal of claim 1 wherein the insert has an annular shape and defines a plurality of openings spaced circumferentially therearound and away from one another, and the first material of the body portion extends through each of the openings to form a mechanical interconnection between the insert and the body portion at the anchor portion.

9. The ring seal of claim 1 wherein the anchor portion is completely surrounded on all sides by the first material of the body portion in order to fix the insert in the body portion.

10. The ring seal of claim 1 wherein the exposed portion has a free end constituting the radially outermost end of the ring seal and has a bend located therein and an angled outer surface extending from the bend that is angled with respect to the radial direction, the angled outer surface is positioned to abut a component of a vessel when an associated joint is assembled.

11. A seal, comprising:
a circumferentially continuous body portion having its greatest dimension orientated substantially in the radial direction, the body portion having an inboard side and an outboard side and comprising a resilient and flexible first material;
a circumferentially continuous skirt portion extending generally axially from and integral with the body portion and comprising the first material, the skirt portion including a generally axially extending inboard leg immediately adjacent the inboard side of the body portion, a generally axially extending outboard leg radially spaced from and adjacent the inboard leg with a recess between them and both legs spaced radially inboard of the outboard side of the body portion, and the skirt portion having its greatest dimension orientated substantially in the axial direction; and
an insert comprising a second material which is more rigid than the first material, the insert including an anchor portion in and surrounded on all sides by the first material of the body portion in order to fix the insert in the body portion, the insert also including an exposed portion extending from the anchor portion and located radially outside of the body portion and constituting the radially outermost structure of the seal, the exposed portion having a bend and an angled outer surface extending from the bend that is angled with respect to the radial and axial directions, the angled outer surface positioned to abut a component of a vessel when an associated joint is assembled.

12. The seal of claim 11 wherein the skirt portion includes, in cross-section and in an uncompressed state, an inboard leg, an outboard leg, and a recess therebetween, wherein, when in a compressed state, the recess is at least partially collapsed and respective inside surfaces of the inboard and outboard legs are located closer toward each other.

13. The seal of claim 11 wherein:
a first sealing surface is located on an axially uppermost surface of the body portion and, when the seal is in the uncompressed state, the first sealing surface extends in the generally radial direction;
a second sealing surface is located on an axially lowermost surface of the body portion and, when the seal is in the uncompressed state, the second sealing surface extends in the generally radial direction and is generally parallel to the first sealing surface;
a third sealing surface is located on a radially innermost surface of the skirt portion and, when the seal is in the uncompressed state, the third sealing surface extends in the generally axial direction; and
a fourth sealing surface is located on a radially outermost surface of the skirt portion and, when the seal is in the uncompressed state, the fourth sealing surface extends in the generally axial direction and is generally parallel to the third sealing surface.

14. The seal of claim 11 wherein the insert has an annular shape and the anchor portion includes a plurality of openings spaced circumferentially therearound and away from one another, and the first material of the body portion extends through each of the openings to form a mechanical interconnection between the insert and the body portion.

15. The seal of claim 11 wherein the anchor portion includes at least one protrusion, and the first material of the body portion surround the protrusion on all sides to form a mechanical interconnection between the insert and the body portion.

* * * * *